(12) United States Patent
Rathod et al.

(10) Patent No.: US 11,718,358 B2
(45) Date of Patent: Aug. 8, 2023

(54) TRACK SHOE OR TRACK PAD HAVING A WEAR MEMBER

(71) Applicant: Caterpillar Inc., Peoria, IL (US)

(72) Inventors: Chandrasen R. Rathod, Peoria, IL (US); Roger L. Recker, Dunlap, IL (US); Thomas J. Yaniak, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 344 days.

(21) Appl. No.: 16/919,878

(22) Filed: Jul. 2, 2020

(65) Prior Publication Data

US 2022/0001943 A1 Jan. 6, 2022

(51) Int. Cl.
*B62D 55/28* (2006.01)
*B62D 55/32* (2006.01)
*C23C 8/22* (2006.01)
*C21D 9/50* (2006.01)
*C21D 9/00* (2006.01)

(52) U.S. Cl.
CPC ............. *B62D 55/28* (2013.01); *B62D 55/32* (2013.01); *C21D 9/0068* (2013.01); *C21D 9/50* (2013.01); *C23C 8/22* (2013.01); *C21D 2211/008* (2013.01)

(58) Field of Classification Search
CPC ........ B62D 55/26; B62D 55/28; B62D 55/32; C23C 8/22
See application file for complete search history.

(56) References Cited

U.S. PATENT DOCUMENTS

| 3,912,338 | A | 10/1975 | Toews |
| 3,972,570 | A | 8/1976 | Massieon |
| 4,635,701 | A * | 1/1987 | Sare ...................... B22D 19/08 164/102 |
| 5,879,743 | A | 3/1999 | Revankar |
| 7,776,451 | B2 | 8/2010 | Jiang et al. |
| 8,678,522 | B2 | 3/2014 | Fischer et al. |
| 9,174,293 | B2 * | 11/2015 | Meyer ..................... C22C 38/02 |
| 10,167,529 | B2 | 1/2019 | Meyer et al. |
| 10,717,483 | B2 * | 7/2020 | Ohishi ................... B62D 55/28 |
| 2018/0187295 | A1 * | 7/2018 | Park ....................... C22C 38/26 |
| 2021/0229763 | A1 * | 7/2021 | Prest ..................... B62D 55/21 |

FOREIGN PATENT DOCUMENTS

| KR | 20000046435 A | 7/2000 | |
| WO | WO-8404760 A1 * | 6/1984 | ............... C23C 8/22 |

* cited by examiner

*Primary Examiner* — Jason R Bellinger
(74) *Attorney, Agent, or Firm* — Bookoff McAndrews PLLC

(57) ABSTRACT

A track shoe includes a base plate, a grouser extending from the base plate, and at least one white iron member. At least a portion of the grouser includes a substantially martensitic structure. The at least one white iron member is fixed to a portion of the grouser.

20 Claims, 5 Drawing Sheets

TRACK SHOE OR TRACK PAD HAVING A WEAR MEMBER

TECHNICAL FIELD

The present disclosure relates generally to a track shoe or track pad, and more particularly, to a wear member on a track shoe or track pad for a track assembly of a machine.

BACKGROUND

Track type machines, such as dozers, loaders, excavators and the like, typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the ground surface. The track shoes often incorporate outwardly projecting grousers, which engage the ground surface and help to provide enhanced traction during use. As the grousers wear down, traction decreases, which may lead to greater track slip when the machine is moving heavy loads. To compensate for such slippage, an operator may be required to reduce the load being transported during each operation or pass across the ground surface, thereby reducing productivity. Moreover, wear of grousers may require repair or replacement of the track shoes, and thus require downtime for the machine. In other machines, track pads are coupled together to form a chain that engages the ground surface under the machine and propels the machine on the ground surface. The ground-facing surface of a track pad may wear down, which may require repair or replacement of one or more track pads and downtime for the machine. As such, wear-resistance and strength, along with costs of maintenance and replacement parts, are considerations in the manufacture and assembly of the track shoe or the track pad.

An exemplary track shoe is disclosed in U.S. Pat. No. 3,912,338 ("the '338 patent") to Toews. The '338 patent discloses a track shoe for an endless track. The track shoe in the '338 patent may include a steel bar welded to a portion of the track shoe, and the steel bar may include hardfaced inserts to impart wear resistance to the track shoe. While the track shoe of the '338 patent may be suitable for some applications, they may not be suitable for other applications.

The track shoes or track pads of the present disclosure may solve one or more of the problems set forth above and/or other problems in the art. The scope of the current disclosure, however, is defined by the attached claims, and not by the ability to solve any specific problem.

SUMMARY

In one aspect, a track shoe may include a base plate, a grouser extending from the base plate, and at least one white iron member. At least a portion of the grouser may include a substantially martensitic structure. The at least one white iron member may be fixed to a portion of the grouser.

In another aspect, a method of producing a track show may include fixing at least one white iron member to an outer surface of a grouser. The at least one white iron member may include a flat base portion, and the grouser may include a flat outer edge portion.

In yet another aspect, a method of producing a track pad may include fixing at least one white iron member to an outer surface of the track pad. The at least one white iron member may include a flat base portion, and the track pad may include a flat outer portion.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," and "approximately" are used to indicate a possible variation of ±10% in the stated value.

Figure 1:
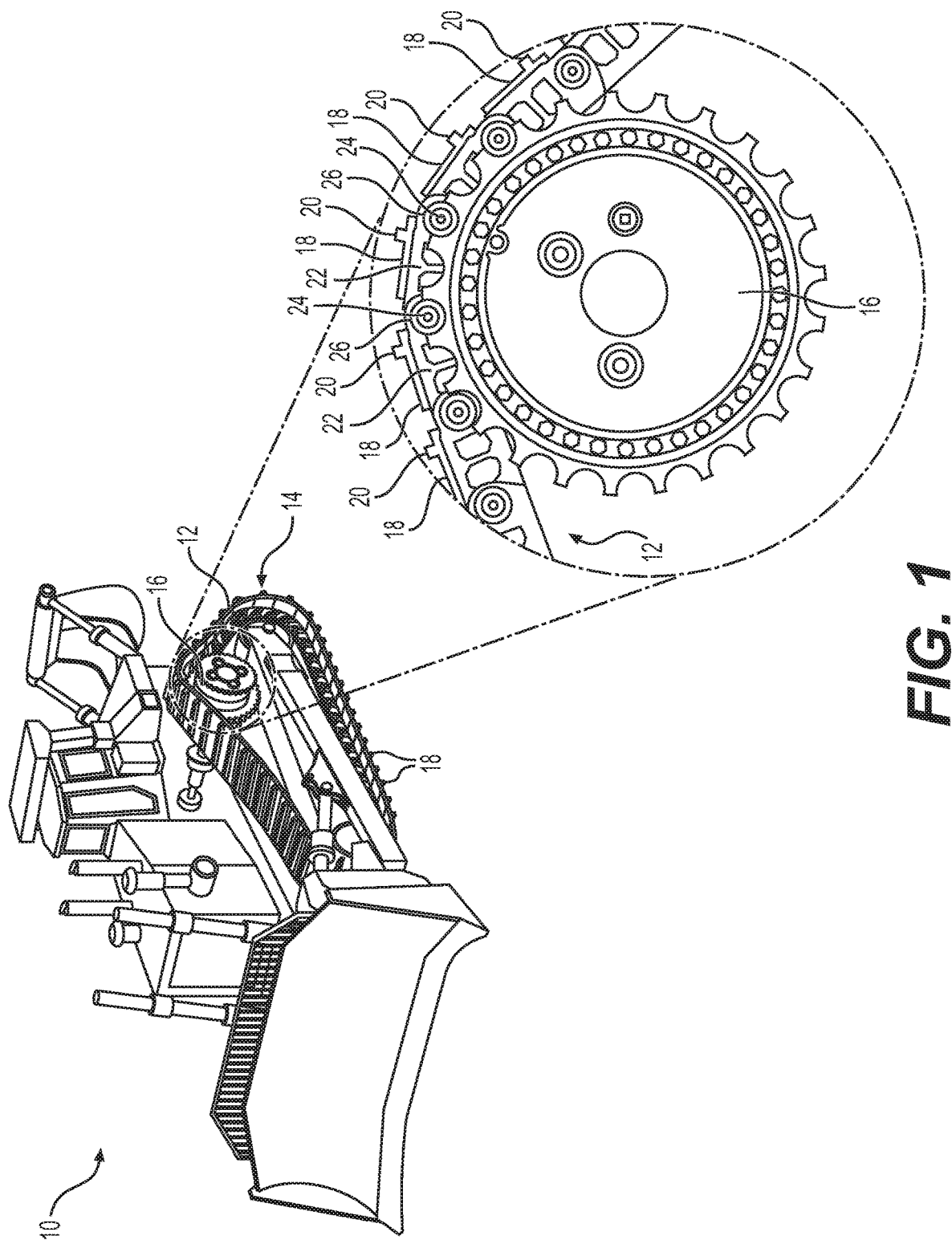
FIG. 1 is a perspective view of an exemplary machine, with an enlarged section of the exemplary machine showing a portion of a track assembly.

FIG. 1 illustrates a machine 10 with a track assembly 12, according to the present disclosure. Machine 10 may be a track-type tractor or any mobile machine that performs some type of operation in an industry, such as mining, construction, farming, transportation, or any other industry known in the art, for example, a dozer, an excavator, a loader, a backhoe, a motor grader, or any other earth moving machine. Track assembly 12, which may also be referred to as a track link assembly, may be coupled to an undercarriage assembly 14 of machine 10 and driven by a machine engine or other power source (not shown) via at least one drive gear or sprocket 16. A separate track assembly 12 may be coupled to each side of machine 10, with each track assembly 12 forming separate endless loops. A plurality of track shoes 18 may be coupled to an outer surface of track assembly 12 in order to aid in the engagement of the ground surface. Each track shoe 18 includes one or more grousers 20.

Track assembly 12 may be a chain that includes multiple structurally similar link subassemblies, each of which may include a pair of links. A pair of links may include a link 22 and a respectively paired link (not shown in the enlarged section of FIG. 1, which is a side view) that is parallel and spaced opposite from link 22. Links 22 and their respectively paired links may be straight or offset links, and each include apertures at respective opposite ends (e.g., a first-end aperture and a second-end aperture). Successive link subassemblies may be coupled by a pin 24 and a bushing 26. For example, to couple a first link subassembly with a successive a second link subassembly, pin 24 may be fixedly received in the first-end apertures of the links of the first link subassembly, and bushing 26 may be fixedly received in the second-end apertures of the links of the second link assembly. As such, pin 24 and bushing 26 couple two link subassemblies together to form a portion of track assembly 12.

Figure 2:
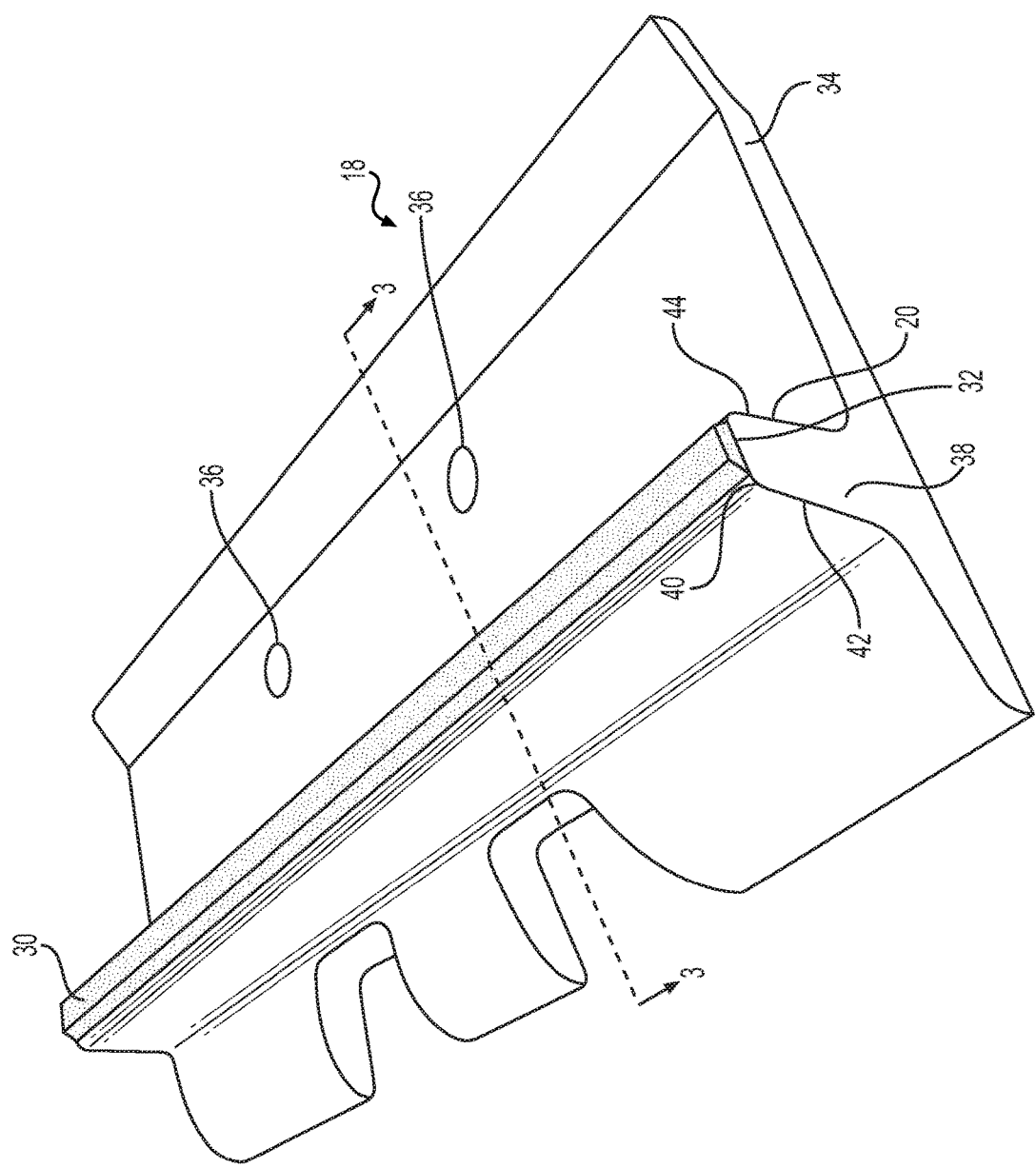
FIG. 2 is a perspective view of an exemplary track shoe for the track assembly.
Figure 3:
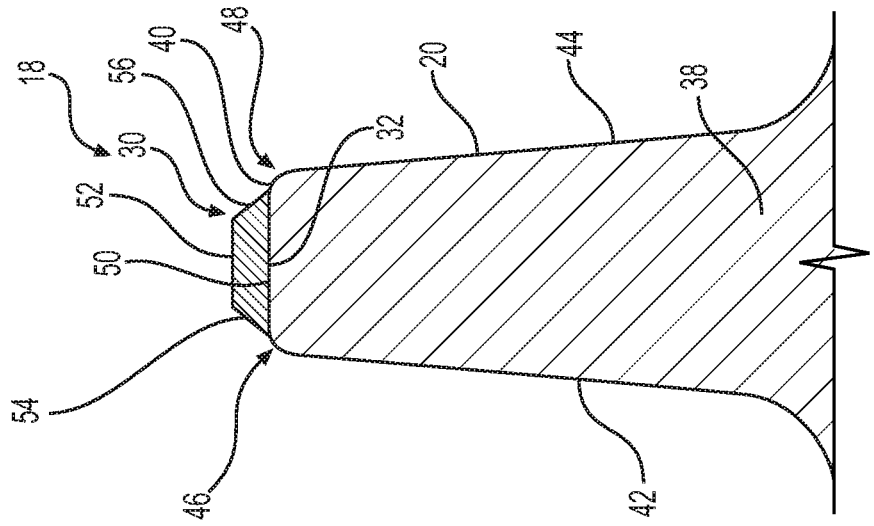
FIG. 3 illustrates a cross-sectional view of a portion of the track shoe of FIG. 2.

FIG. 2 is a perspective view of track shoe 18, according to aspects of the present disclosure. FIG. 3 is a longitudinal cross-sectional view of a portion of track shoe 18, corresponding to the cross-section 3-3 marked in FIG. 2. As shown in these figures, track shoe 18 includes grouser 20, and one or more wear elements 30 may be affixed to a portion of grouser 20. As discussed in detail below, wear element 30 includes one or more elements separate from grouser 20. Wear element 30 may be wear-resistant, for example, formed of white iron, and wear element 30 is affixed to grouser 20, for example, via brazing at an interface 32. Wear element 30 may be formed of a white iron plate or one or more white iron blocks. Wear element 30 may serve as a wear-resistant layer providing grouser 20, and thus track shoe 18, with enhanced wear resistance when grouser 20 engages with the ground surface.

For example, as shown in FIG. 2, track shoe 18 may include a base plate 34, and grouser 20 may project away from base plate 34. Base plate 34 may include one or more holes 36, for example, to couple base plate 34, and thus track shoe 18, to links of track assembly 12 via bolts or other appropriate fasteners (not shown). Grouser 20 may extend generally normal to and across base plate 34 so as to be oriented in substantially transverse relation to the travel direction of track assembly 12 during operation. As track assembly 12 moves, grouser 20 may dig into the ground surface and may help to provide enhanced traction. In the illustrated exemplary construction, grouser 20 includes a generally trapezoidal cross-section (e.g., forming an isosceles trapezoid) or a generally pyramidal cross-section (with a flat top rather than an apex), including a grouser base 38 in proximal relation to base plate 34 and a distal end surface 40 defining a relatively narrow width plateau elevated in relation to grouser base 38. A first lateral face 42 and a second lateral face 44 extend in an angled relation away from opposing perimeter edges of distal end surface 40 towards grouser base 38. As shown in FIG. 3, the intersection between distal end surface 40 and the first lateral face 42 defines a first corner transition zone 46. The intersection between the distal end surface 40 and the second lateral face 44 defines a second corner transition zone 48. The first corner transition zone 46 and/or the second corner transition zone 48 may be slightly rounded, as illustrated, or may incorporate sharp corners. Although not shown, grouser 20 may include one or more recesses in distal end surface 40, for example, to receive one or more portions of wear element 30.

In general, portions of track shoe 18 may have any suitable shape, size, and/or surface texture. For example, a portion of the outer surface of grouser 20 (e.g., distal end surface 40) may include a textured surface, which may help to form the coupling between grouser 20 and wear element 30.

As discussed below with respect to FIG. 7, track assembly 12 may include a plurality of track pads 770. For example, machine 10 may be a large excavator machine that moves across the ground surface with a plurality of track pads 770 forming track assembly 12. In this aspect, each track pad 770 may include a ground-side face 772 that abuts the ground surface to help move the machine across the ground surface. Each ground-side face 772 may include a relatively flat portion 774. Each ground-side face 772 may also include, for example, a first transition portion 776 and a second transition portion 778, for example, to the front and rear of flat portion 774. One or more wear elements 730 may be affixed to one or more portions of ground-side faces 772 of track pads 770, as discussed with respect to track shoe 18 herein. For example, one or more wear elements 730 may be coupled to flat portion 774 at an interface 732, as discussed with respect to grouser 20 and wear element 30.

As shown in FIGS. 2 and 3, wear element 30 may be faceted. For example, wear element 30 may include a substantially trapezoidal cross-sectional shape, for example, a cross-section that forms an isosceles trapezoid, or a substantially pyramidal cross-sectional shape with a flat top rather than an apex. In these aspects, wear element 30 may include a base 50 and a distal end surface 52, with distal end surface 52 defining a relatively narrow width plateau evaluated in relation to base 50. A first lateral face 54 and a second lateral face 56 extend in an angled relation away from opposing perimeter edges of distal end surface 52 towards base 50. Base 50 of wear element 30 and distal end surface 40 of grouser 20 may each include substantially flat portions, for example, at interface 32. The respective flat portions may aid in the coupling of wear element 30 to grouser 20, for example, via brazing. Additionally, wear element 30 may include a thickness of approximately 1-15 mm, for example, approximately 6-9 mm. In another aspect, wear element 30 may include a thickness of approximately 3-5 mm. In yet another aspect, wear element 30 may include a thickness of approximately 1-2 mm. In one example, wear element 30 may include a thickness that is less than or equal to approximately 25% of the height (or cross-sectional thickness) of grouser 20. In another example, wear element 30 may include a thickness that is approximately 5-15%, for example, approximately 10%, of the height of grouser 20.

Although wear element 30 is shown and discussed as having a substantially trapezoidal cross-section, this disclosure is not so limited. For example, wear element 30 may include a cross-section that is substantially rectangular, semi-circular, triangular, etc. Moreover, although wear element 30 is shown as extending an entirety of distal end surface 40, this disclosure is not so limited. In some aspects, wear element 30 may extend over one or more portions of distal end surface 40. For example, wear element 30 may extend over less than an entire lateral width of the track shoe 18, and may only extend across a central lateral portion of distal end surface 40, such that, for example, portions of distal end surface 40 on respective lateral ends may be exposed. In another example, wear element 30 may extend over a central longitudinal portion of distal end surface 40, such that, for example, portions of distal end surface 40 on respective longitudinal ends may be exposed. Moreover, as discussed below, wear element 30 may include a plurality of wear members successively arranged on or otherwise positioned on distal end surface 40.

Track shoe 18 may be formed by a rolling operation applied to an ingot such that base plate 34 and grouser 20 are integrally formed from a common ductile material, such as, for example, a machinable carbon steel or the like. Track shoe 18, including grouser 20, may be formed of steel of any suitable type. In some embodiments, track shoe 18 may be formed of high-carbon chromium steel. High-carbon chromium steel encompasses chromium-containing steel having a carbon content of 0.55 wt. % or higher, such as 52100 alloy steel. Alternatively or additionally, track shoe 18 may be fabricated from a low alloy steel, such as, for example, low alloy boron steel. While the use of ductile materials may aid in formation of the track shoe 18, such materials may also be susceptible to wear during use in an abrasive environment.

One or more portions of track shoe 18 may be carburized, hardened, heat treated, etc. For example, the steel forming track shoe 18 may be heat-treated steel (e.g., using induction or furnace heating) or non-heat-treated steel. Examples of heat treatment processes include carburization and case hardening. Distal end surface 40 of grouser 20 may be carburized, hardened, or otherwise heat treated, for example, after wear element 30 is coupled to grouser 20. In some embodiments, in addition to or as an alternative to using high-carbon chromium steel for track shoe 18, the outer surface of grouser 20 (e.g., distal end surface 40) may be carburized at locations where wear element 30 is disposed. It is noted that the aforementioned carburization or heat treatment steps may be performed before and/or after brazing or otherwise coupling wear element 30 to track shoe 18. Moreover, distal end surface 40 of grouser 20 may be machined and/or ground, for example, to help form a uniform mating surface for coupling wear element 30.

Figure 7:
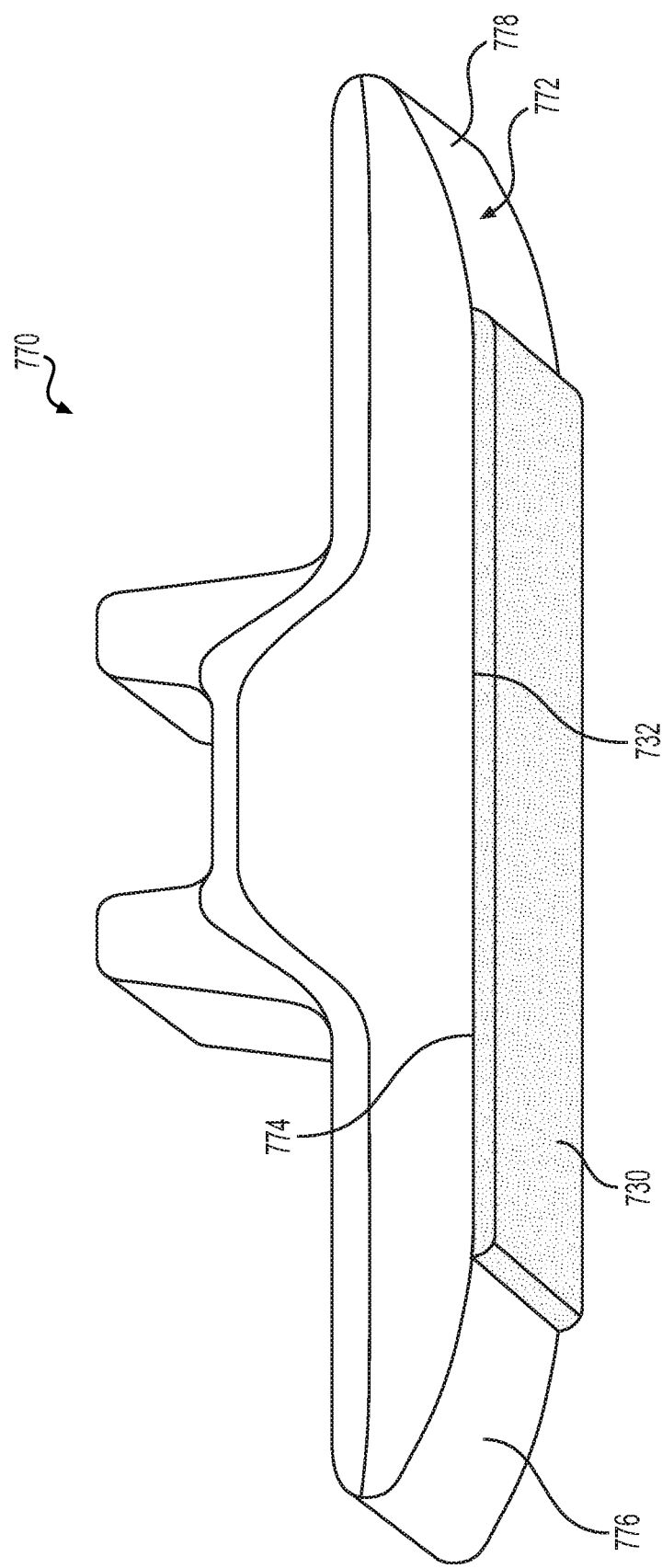
FIG. 7 illustrates a perspective view of an exemplary track pad.

As shown in FIG. 7, track pad 770 may be formed by, for example, casting. Track pad 770 may be formed in the desired shape and/or size, which may depend on the size and/or type of machine 10. Moreover, ground-side face 772 of track pad 770 and/or the one or more portions of track pad 770 that are coupled to wear element 730 may be machined and/or ground, for example, to help form a uniform mating surface for coupling wear element 730.

As mentioned above, wear element 30 includes one or more separate elements from grouser 20, and may be formed of a wear-resistant material, such as white iron. Wear element 30 may be formed by casting. For example, wear element 30 may be formed by shell mold casting, blast foam casting, steel casting, etc.

In this disclosure, the term "white iron" means cast iron in which all or substantially all carbon is present as carbide. When formed of white iron, wear element 30 may be referred to as white iron member(s). Examples of white iron include pearlitic (FeC) white irons, Ni-hard or Ni—Cr ($M_3C$) white irons, Ni-hard 4 ($M_7C_3$) white irons, and high-Cr ($M_7C_3$) white irons (also referred to as "high chrome white irons"). In some embodiments, wear element 30 may include white iron member(s) formed of a high chrome white iron having a chromium content of 12 wt. % or higher (e.g., a chromium content of 12 wt. %, 15 wt. %, 20 wt. %, or 25 wt. %) and suitable contents of other elements (e.g., a carbon content in a range of 2 to 3 wt. %, a molybdenum content of 0.5 to 3.5 wt. %, a manganese content of 0.5 to 1.5 wt. %, a silicon content of up to 1.0 wt. %, and a nickel content of up to 0.5 wt. %), with a balance being iron. Examples of white irons include white irons specified by ASTM A532 (e.g., ASTM A532 II-A, II-B, II-C, II-D, II-E, and III-A high chrome cast irons, and ASTM A532 Ni-hard cast irons). White irons may also be referred to as abrasion-resistant cast irons. While examples of white irons have been given, the present disclosure is not so limited, and it is understood that a white iron member may be formed of any suitable hard wear facing white iron.

Wear element 30 may be affixed to the grouser 20 by any suitable fixation method, for example, soldering, welding, bonding, or one or more other coupling mechanisms. In some embodiments, and as discussed herein, wear element 30 is brazed to the outer surfaces of grouser 20, for example, by melting and/or flowing (e.g., by capillary action) a filler metal (e.g., one or more of aluminum-silicon, copper (e.g., copper powder), copper-silver, copper-zinc (brass), copper-tin (bronze), gold-silver, a nickel alloy (e.g., Nicrobraz 152 by Wall Colmonoy), silver, an amorphous brazing foil using nickel, iron, copper, silicon, boron, phosphorous, and/or other materials) between wear element 30 and grouser 20. In this aspect, wear element 30 is fixed to grouser 20 via a solidified brazing filler at interface 32. The solidified brazing filler may be referred to as a brazed joint.

As mentioned above, track assembly 12 may include a plurality of track pads 770. Additionally, it is contemplated that one or more wear elements 730 may be affixed to ground-side face 772 of one or more track pads 770. In this manner, the one or more wear elements 730 may be affixed, for example, brazed, to one or more portions of track pads 770.

Figure 4:
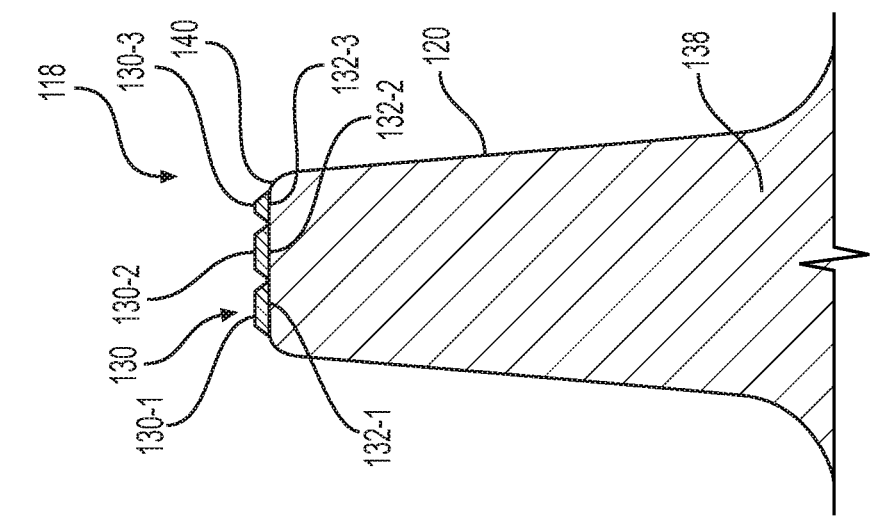
FIG. 4 illustrates a cross-sectional view of a portion of another exemplary track shoe.

FIG. 4 illustrates a cross-sectional view of another exemplary grouser 120 with a wear element 130 that may form a portion of a track shoe 118, with similar elements to grouser 20 and wear element 30 shown by 100 added to the reference numbers. As shown in FIG. 4, in some aspects, wear element 130 may include a plurality of wear members 130-1, 130-2, 130-3. Wear members 130-1, 130-2, 130-3 may be coupled to grouser 120, which includes a grouser base 138 and a distal end surface 140. Wear members 130-1, 130-2, 130-3 may be coupled to distal end surface 140 at respective interfaces 132-1, 132-2, 132-3, as discussed above, for example, by brazing wear members 130-1, 130-2, 130-3 to distal end surface 140.

Each wear member 130-1, 130-2, 130-3 may be substantially trapezoidal, as discussed above. Alternatively, one or more wear member 130-1, 130-2, 130-3 may be substantially triangular. Additionally, each wear member 130-1, 130-2, 130-3 may be spaced longitudinally along grouser 120 (e.g., along the short width of grouser 120) and may extend laterally along distal end surface 140 of grouser 120 (e.g., along the long length of grouser 120). Alternatively or additionally, wear members 130-1, 130-2, 130-3 may be spaced laterally along grouser 120 (e.g., along the long length of grouser 120) and may extend longitudinally along distal end surface 140 of grouser 120 (e.g., along the short width of grouser 120). Each wear member 130-1, 130-2, 130-3 may be substantially equal sizes, or, as shown, one wear member (e.g., wear member 130-3) may be a different size (e.g., smaller) and/or a different cross-sectional shape than one or more other wear member(s) (e.g., wear members 130-1 and 130-2).

Although three wear members 130-1, 130-2, 130-3 are shown in FIG. 4, this disclosure is not so limited. For example, wear element 130 may include two, four, five, etc. wear members. These wear members may be arranged on distal end surface 140 of grouser 120 in any manner discussed herein.

Figure 5:
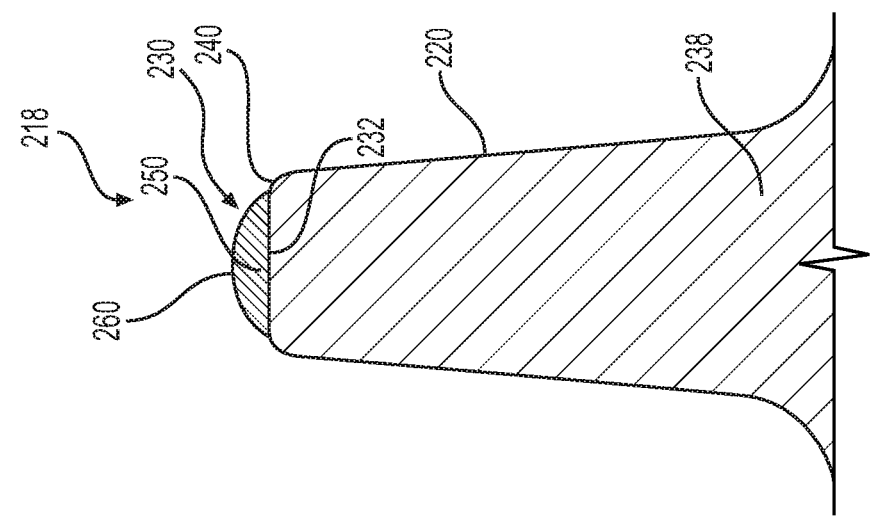
FIG. 5 illustrates a cross-sectional view of a portion of yet another exemplary track shoe.

FIG. 5 illustrates a cross-sectional view of another exemplary grouser 220 with a wear element 230 that may form a portion of a portion of a track shoe 218, with similar elements to grouser 20 and wear element 30 shown by 200 added to the reference numbers. Wear element 230 may be coupled to grouser 220, which includes a grouser base 238 and a distal end surface 240. Wear element 230 may be coupled to distal end surface 240 at an interface 232, as discussed above, for example, by brazing a base 250 of wear element 230 to distal end surface 240. Wear element 230 may extend over one or more portions of distal end surface 240. For example, wear element 230 may extend over less than an entire lateral width of the track shoe 218, and may only extend across a central lateral portion of distal end surface 240, such that, for example, portions of distal end surface 240 on respective lateral ends may be exposed. In another example, wear element 230 may extend over a central longitudinal portion of distal end surface 240, such that, for example, portions of distal end surface 240 on respective longitudinal ends may be exposed As shown in FIG. 5, in some aspects, wear element 230 may include a rounded distal end surface 260. In this aspect, wear element 230 may be partially circular (as shown), or may include a partially circular portion to form rounded distal end surface 260. Rounded distal end surface 260 may help to reduce a likelihood and/or tendency of wear element 230 chipping or otherwise wearing away when contacting the ground surface since rounded distal end surface 260 includes rounded edges.

Figure 6:
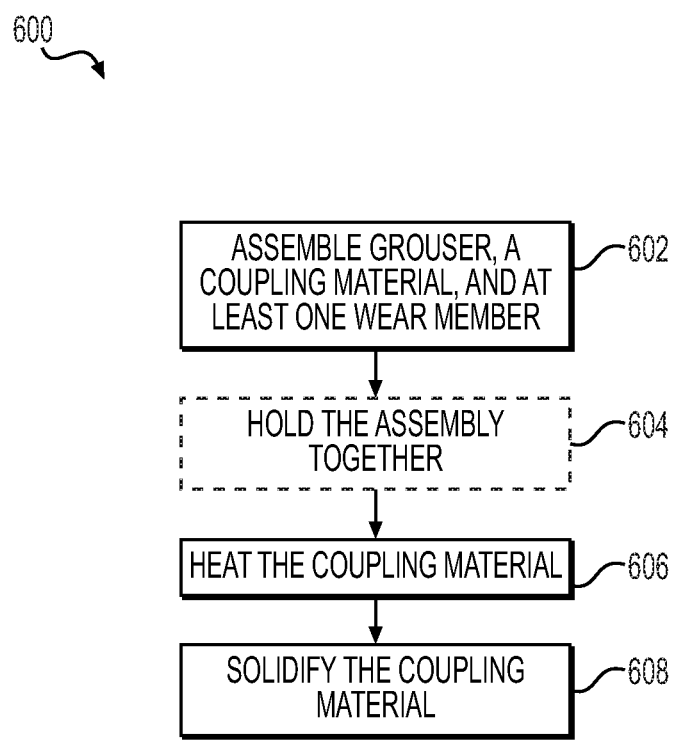
FIG. 6 is a flowchart illustrating a method of coupling a wear member to a portion of a track shoe.

FIG. 6 is a flowchart illustrating a method 600 of fixing a wear element to a grouser of a track shoe, for example, by brazing. For example, method 600 may be performed to form portions of track shoes 18, 118, 218. Although not shown, one or more holding fixtures (e.g., blocks, clamps, straps, etc.) may be used to help hold the wear element(s) in position relative to the grouser during the brazing method. Moreover, one or more steps of method 600 may be employed to couple one or more wear members 730 to track pad 770.

For example, a step 602 may include assembling a grouser of a track shoe (e.g., grouser 20 of track shoe 18), a coupling material (e.g., a brazing filler and/or a brazing paste), and at least one wear member (e.g., wear members 30, 130, 230). In the brazing assembly, wear element(s) 30, 130, 230 may be mated to grouser 20, with a brazing filler interposed between wear element(s) 30, 130, 230 and grouser 20, for example, at interface(s) 30, 130, 230. Brazing filler may initially be in the form of a sheet or foil (e.g., pure copper, a copper-based alloy, pure nickel, a nickel-based alloy, or a blend of copper-based and nickel-based alloys) that is positioned at interface 32, 132, 232, for example, on at least the portion of distal end surface 40, 140, 240 of grouser 20, 120, 220 that is to be covered by wear element(s) 30, 130, 230. Additionally or alternatively, a brazing paste may be positioned and/or applied between and/or around interface 32, 132, 232 and/or around the edges of wear element(s) 30, 130, 230. For example, the brazing paste may be applied as a bead around wear element(s) 30, 130, 230. The brazing paste may include a powder (e.g., pure copper, a copper-based alloy, pure nickel, a nickel-based alloy, or a blend of copper-based and nickel-based alloys) and a binder material (e.g., a water-based gel suspension agent). The binder material may burn off when heated (e.g., via a brazing procedure in a furnace). The brazing procedure may be performed with the brazing filler, with the brazing paste, or with both the brazing filler and the brazing paste.

Optionally, a step 604 may include holding the assembly together, for example, using one or more holding fixtures. In step 604, for example, one or more holding fixtures may be placed on or around wear element(s) 30, 130, 230 and/or portions of grouser 20, 120, 220 to hold or otherwise secure respective elements in place.

Next, a step 606 may include heating the coupling material (e.g., the brazing filler and/or the brazing paste) so that the coupling material melts. In one aspect, the brazing filler may melt and/or flow between wear element(s) 30, 130, 230 and grouser 20, 120, 220. Moreover, heating may cause a brazing paste to melt and/or flow between wear element(s) 30, 130, 230 and grouser 20, 120, 220. Heating may also help to remove (i.e., burn off) the filler material in the brazing paste. The brazing may be performed in a furnace, for example, a vacuum furnace. The heating may be performed while holding the assembly together using one or more holding fixtures, as discussed with respect to optional step 604.

A step 608 may then include solidifying the coupling material, for example, a brazing filler and/or a brazing paste. In step 608, the coupling material may be cooled and solidified so that wear element(s) 30, 130, 230 are joined to track shoe 18 (e.g., to grouser 20, 120, 220) via the solidified coupling material (e.g., a brazing filler or brazing paste). In one aspect, track shoe 18 may be removed from the furnace and quenched (e.g., in an oil or polymer). The entire assembly may be heated in step 606 and cooled in step 608. Although not shown, in an instance where wear members 130-1, 130-2, 130-3 abut one another or are closely positioned on grouser 20, 120, 220, the solidified coupling material may also join the adjacent wear members to one another, for example, by partially or fully flow into and filling a gap between adjacent wear members.

Although embodiments using brazing have been described, it is also possible to attach wear elements 30, 130, 230 to grouser 20, 120, 220 using other suitable forms of attachment. For example, other forms of attachment may include soldering (e.g., high strength soldering), mechanical press fitting, welding (e.g., plasma-transferred arc (PTA) welding), and/or attachment via epoxy and/or other adhesives. That is, wear elements 30, 130, 230 may be soldered, mechanically press fitted (e.g., within one or more recess in grouser 20, 120, 220 forming openings to receive wear elements 30, 130, 230), welded, or adhered to grouser 20, 120, 220. It is noted that the various forms of attachment are not intended to be mutually exclusive, and may be used in combination with one another.

Furthermore, one or more wear elements 30, 130, 230 may include more than one flat inner surface, for example, an inner surface with two flat surfaces forming a V-shaped inner surface. One or more wear elements 30, 130, 230 may also include three or more flat inner surfaces. Moreover, distal end surface 40, 140, 240 of grouser 20, 120, 220 may include one or more outer surfaces that matingly correspond to the surface(s) of the one or more wear elements 30, 130, 230. For example, if wear element 30 includes a V-shaped base 50, grouser 20 may include a V-shaped distal end surface 40. Wear element 30 and grouser 20 may be coupled, as discussed above.

Alternatively or additionally, although not shown, grouser 20, 120, 220 may include one or more wear elements on the sides of grouser 20, 120, 220, for example, on one or more portions of first lateral face 42 and/or second lateral face 44, and/or, for example, on one or more portions of first corner transition zone 46 and/or second corner transition zone 48.

As discussed above, and as shown in FIG. 7, track pad 770 includes ground-side face 770, and one or more wear elements 730 may be coupled to ground-side face 770. For example, one or more wear elements 730 may be coupled to flat portion 774 of ground-side face 772. Furthermore, although not shown, track pad 770 may include one or more of the aspects discussed above with respect to grousers 20, 120, 220. For example, track pad 770 may include a plurality of wear members 730 coupled to ground-side face 772, as discussed above with respect to FIG. 4. Alternatively or additionally, track pad 770 may include one or more wear members 730 coupled to one or more other portions of track pad 770, for example, to one or more of transition zones 776 and/or 778 of ground-side face 772.

INDUSTRIAL APPLICABILITY

The disclosed aspects of track assembly 12 may be used in any machine that includes a tracked undercarriage that includes track shoes 18 (or track pads 770) that engage with the ground surface to help propel machine 10. Aspects of the track shoes 18 described herein may provide greater wear-resistance, a longer work duration, an increased performance, a reduced risk of deformation, and a lower likelihood and/or frequency of requiring maintenance or replacement. Additionally, the size and thickness of track shoe 18, the number, position, thickness, etc. of wear elements 30, 130, 230, and other aspects discussed here may be modified to suit different track assemblies 12 and/or machines 10.

The disclosed aspects of track shoe 18, including grouser 20, 120, 220 and wear elements 30, 130, 230, may provide wear-resistance for the portion of track shoe that contacts and/or engages with the ground surface. Accordingly, track shoe wear life may be increased, leading to lower fleet undercarriage maintenance costs and less machine downtime.

As described above, wear elements 30, 130, 230, 730 may be made of white iron, which provides for wear resistance. The white iron material of wear elements 30, 130, 230, 730 may be different from the material of the underlying grousers 20, 120, 220 or ground-side face 772 of track pad 770. Therefore, wear elements 30, 130, 230, 730 may serve a specialized wear-resistant layer that confers wear resistance to grousers 20, 120, 220 or ground-side face 772, while avoiding potential expenses of having the entire grouser or ground-side face (or even the entire track shoe or track pad) be constructed of the same wear-resistant material. Moreover, grousers 20, 120, 220 or one or more portions of track pad 770 may be formed of thinner and/or less costly material, with wear elements 30, 130, 230, 730 helping to increase the wear resistance and/or lifetime of track shoe 18 or track pad 770. Grousers 20, 120, 220 or ground-side face 772 may additionally have wear-resistant properties, such as a high-carbon chromium steel composition and/or a carburized layer as described above. Therefore, if one or more portions of wear elements 30, 130, 230, 730 become worn out, grouser 20, 120, 330 or ground-side face 772 may still function with a degree of wear resistance.

Moreover, wear elements 30, 130, 230, 730 are coupled to grousers 20, 120, 220 or ground-side face 772 via interfaces 32, 132, 232, 732 with each surfaces at interfaces 32, 132, 232, 732 including flat faces. In this aspect, for example, brazing wear elements 30, 130, 230, 730 and grousers 20, 120, 220 or ground-side face 772 may help to allow the brazing material (e.g., a brazing filler and/or a brazing paste) to flow between wear elements 30, 130, 230, 730 and grousers 20, 120, 220 or ground-side face 772. Interfaces 32, 132, 232, 732 being flat may also help to increase the contact area and/or the strength of the coupling between wear elements 30, 130, 230, 730 and grouser 20, 120, 220 or ground-side face 772. Moreover, interfaces 32, 132, 232, 732 being flat may help to minimize risks of poor bonding, separation, etc., as there may be a reduced risk of differences in thermal expansion (e.g., between wear elements 30, 130, 230, 730 and grousers 20, 120, 220 or ground-side face 772) and/or other material properties affecting the contact areas, interfaces 32, 132, 232, 732 and/or brazing materials.

Additionally, aspects discussed herein may help to increase the strength, durability, etc. of track shoe 18 or track pad 770. The heat treatment, brazing, and/or quenching used to couple wear elements 30, 130, 230, 730 and grousers 20, 120, 220 or ground-side face 772 may help to increase the strength, durability, etc. of the connection between wear elements 30, 130, 230, 730 and grousers 20, 120, 220 or ground-side face 772. For example, the heat treatment, brazing, and/or quenching may help to form a substantially martensitic structure in at least a portion of grousers 20, 120, 220 (e.g., distal end surface 40) or ground-side face 772. In one aspect, the heat treatment, brazing, and/or quenching may help to transform at least a portion of grouser 20, 120, 220 or ground-side face 772 from a substantially austenitic structure to the substantially martensitic structure. For example, the heat treatment, brazing, and/or quenching may help to ensure that one or more portions of grousers 20, 120, 220 or ground-side face 772 do not anneal (or cool slowly) and form an austenitic structure. Additionally, in one example, the brazing of wear elements 30, 130, 230, 730 to grousers 20, 120, 220 or ground-side face 772, along with the subsequent quenching, may help to form a substantially carbide structure in at least a portion of wear elements 30, 130, 230, 730 (e.g., base 50). These structures may help to increase the strength, durability, etc. of the connection between wear elements 30, 130, 230, 730 and grousers 20, 120, 220 or ground-side face 772.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. A track shoe, comprising:
    a base plate;
    a grouser extending from the base plate, wherein at least a portion of the grouser includes a substantially martensitic structure, wherein the grouser includes a lateral long length and a longitudinal short width; and
    a plurality of white iron members, wherein the plurality of white iron members are fixed to the portion of the grouser, and wherein the plurality of white iron members are longitudinally spaced along on the longitudinal short width of the grouser.

2. The track shoe of claim 1, wherein the grouser extends from the base plate and includes a distal end surface, wherein the plurality of white iron members are coupled to the distal end surface of the grouser.

3. The track shoe of claim 2, wherein the distal end surface includes at least one flat portion, and wherein the plurality of white iron members are coupled to the at least one flat portion.

4. The track shoe of claim 3, wherein the plurality of white iron members are brazed to the distal end surface.

5. The track shoe of claim 2, wherein the grouser includes a base portion that is wider than the distal end surface, and wherein each of the plurality of white iron members include a base portion and a distal end surface that is narrower than the base portion of the white iron member.

6. The track shoe of claim 5, wherein the grouser is formed of a steel, and wherein at least the distal end surface of the grouser is carburized.

7. The track shoe of claim 1, wherein at least a portion of each of the plurality of white iron members include a substantially carbide structure, and wherein the portion of each of the plurality of white iron members that includes the substantially carbide structure is fixed to the portion of the grouser that includes the substantially martensitic structure.

8. The track shoe of claim 1, wherein at least one white iron member is a different size than at least one other of the plurality of white iron members.

9. The track shoe of claim 1, wherein at least one white iron member of the plurality of white iron members includes a rounded distal end surface.

10. A method of producing a track shoe, comprising:
fixing a plurality of white iron member members to an outer surface of a grouser, wherein the grouser includes a lateral long length and a longitudinal short width, wherein each of the plurality of white iron members include a flat base portion, wherein the grouser includes a flat outer edge portion, and wherein the plurality of white iron members are longitudinally spaced along the longitudinal short width of the grouser.

11. The method of claim 10, wherein the fixing the plurality of white iron members includes brazing the plurality of white iron members to the grouser.

12. The method of claim 11, further comprising carburizing at least a portion of the grouser either before or after brazing the plurality of white iron members to the grouser.

13. The method of claim 11, further comprising quenching the track shoe after brazing the plurality of white iron members to the grouser, such that at least a portion of each of the plurality of white iron members includes a substantially carbide structure and at least a portion of the grouser includes a substantially martensitic structure.

14. The track shoe of claim 1, wherein the plurality of white iron members includes a thickness that is approximately 10% of a height of the grouser.

15. A track shoe, comprising:
a base plate;
a grouser extending from the base plate, wherein the grouser is formed of a steel, wherein the grouser includes a base portion and a distal end surface, wherein the base portion is wider than the distal end surface, wherein at least the distal end surface of the grouser is carburized, and wherein the distal end surface includes a lateral long length and a longitudinal short width; and
a plurality of white iron members, wherein the plurality of white iron members are fixed to the distal end surface of the grouser, wherein each of the plurality of white iron members include a base portion and a distal end surface that is narrower than the base portion of the white iron member, and wherein one or more white iron members are a different size or cross-sectional shape from one or more other white iron members.

16. The track shoe of claim 15, wherein the plurality of white iron members includes a thickness that is approximately 10% of a height of the grouser.

17. The track shoe of claim 15, wherein the plurality of white iron members are longitudinally spaced along the longitudinal short width of the distal end surface of the grouser.

18. The track shoe of claim 15, wherein one or more white iron members include a trapezoidal cross-sectional shape.

19. The track shoe of claim 15, wherein the plurality of white iron members are brazed to the distal end surface of the grouser.

20. The track shoe of claim 15, wherein at least a portion of each of plurality of white iron members include a substantially carbide structure, wherein the distal end surface of the grouser includes a substantially martensitic structure, and wherein the portion of each of the plurality of white iron members that includes the substantially carbide structure is fixed to the portion of the grouser that includes the substantially martensitic structure.

* * * * *